US006974315B2

(12) United States Patent
Dees

(10) Patent No.: US 6,974,315 B2
(45) Date of Patent: Dec. 13, 2005

(54) REDUCED FRICTION GEROTOR

(75) Inventor: Jesse Dees, Slinger, WI (US)

(73) Assignee: Harley-Davidson Motor Company Group, Inc., Milwaukee, WI (US)

(*) Notice: Subject to any disclaimer, the term of this patent is extended or adjusted under 35 U.S.C. 154(b) by 0 days.

(21) Appl. No.: 10/368,890

(22) Filed: Feb. 18, 2003

(65) Prior Publication Data

US 2004/0161355 A1 Aug. 19, 2004

(51) Int. Cl.[7] .............................................. F04C 18/00
(52) U.S. Cl. ...................... 418/171; 418/178; 418/171
(58) Field of Search ............................... 418/171, 166, 418/178, 196 R, 71; 123/196 R

(56) References Cited

U.S. PATENT DOCUMENTS

| | | | | |
|---|---|---|---|---|
| 4,413,960 A | * | 11/1983 | Specht | 418/171 |
| 4,493,620 A | * | 1/1985 | Takei et al. | 417/366 |
| 4,501,536 A | | 2/1985 | Middlekauff | |
| 4,545,748 A | | 10/1985 | Middlekauff | |
| 4,563,136 A | | 1/1986 | Gervais et al. | |
| 4,699,577 A | | 10/1987 | Dlugokecki et al. | |
| 4,813,856 A | | 3/1989 | Dlugokecki | |
| 4,881,880 A | | 11/1989 | Dlugokecki | |
| 4,957,187 A | | 9/1990 | Burgess | |
| 4,976,595 A | * | 12/1990 | Taniguchi | 418/171 |
| 5,062,776 A | | 11/1991 | Dlugokecki | |
| 5,071,327 A | | 12/1991 | Brewer | |
| 5,085,187 A | * | 2/1992 | Black | 418/171 |
| 5,501,585 A | * | 3/1996 | Ogawa et al. | 418/171 |
| 6,047,667 A | | 4/2000 | Leppanen et al. | |
| 6,402,488 B2 | * | 6/2002 | Watanabe et al. | 418/171 |
| 6,568,929 B2 | * | 5/2003 | Takagi | 418/71 |

FOREIGN PATENT DOCUMENTS

| | | | | |
|---|---|---|---|---|
| JP | 01159479 A | * | 6/1989 | F04C 15/00 |
| JP | 01219375 A | * | 9/1989 | F04C 15/00 |
| JP | 03202686 A | * | 9/1991 | F04C 15/00 |

* cited by examiner

*Primary Examiner*—Theresa Trieu
(74) *Attorney, Agent, or Firm*—Michael Best & Friedrich LLP

(57) ABSTRACT

An oil pump for a vehicle engine. The oil pump includes an oil pump housing and a gerotor. The oil pump housing includes a cavity that defines an inside diameter. The gerotor is positioned within the cavity, is rotatable relative to the housing, and defines a thickness and an outside diameter. The distance between the inside diameter and the outside diameter is non-uniform across the thickness.

14 Claims, 4 Drawing Sheets

REDUCED FRICTION GEROTOR

FIELD OF THE INVENTION

The invention relates to oil pumps, and more particularly, to oil pumps having gerotors.

BACKGROUND OF THE INVENTION

Prior art motorcycle engines generally include either a dry sump or wet sump lubrication system. In a dry sump lubrication system, the oil is pumped out of the crankcase sump and into an external oil tank or reservoir before the oil is recirculated to the engine. In a wet sump lubrication system, the oil is either slung from the crankcase sump with an oil slinger, or pumped from the crankcase sump to the components of the engine with an oil pump.

One type of oil pump is a gerotor pump, which includes a pump housing and a gerotor positioned within the housing and rotatable relative to the housing. Gerotors generally include a gear having external teeth, and a ring having internal teeth and surrounding the gear. An intake kidney is provided immediately adjacent the gear and ring, allowing oil to be drawn into the gerotor as the gear and ring rotate relative to the pump housing. A discharge kidney is also provided that allows oil to pass out of the gerotor.

Oil is introduced between the ring and the housing to reduce friction as the ring rotates relative to the housing. Although the oil significantly reduces friction between the ring and the housing, a portion of the power driving the ring goes into the shearing of the oil between the ring and the housing.

SUMMARY OF THE INVENTION

The present invention provides an oil pump that reduces the shearing force between the ring and the housing. The oil pump includes an oil pump housing and a gerotor. The oil pump housing includes a cavity that defines an inside diameter. The gerotor is positioned within the cavity, is rotatable relative to the housing, and defines a thickness and an outside diameter. The distance between the inside diameter and the outside diameter is non-uniform across the thickness. In one embodiment, the non-uniform distance is produced by a non-uniform inside diameter, and in another embodiment it is produced by a non-uniform outside diameter.

Other features and advantages of the invention will become apparent to those skilled in the art upon review of the following detailed description, claims, and drawings.

Figure 1:
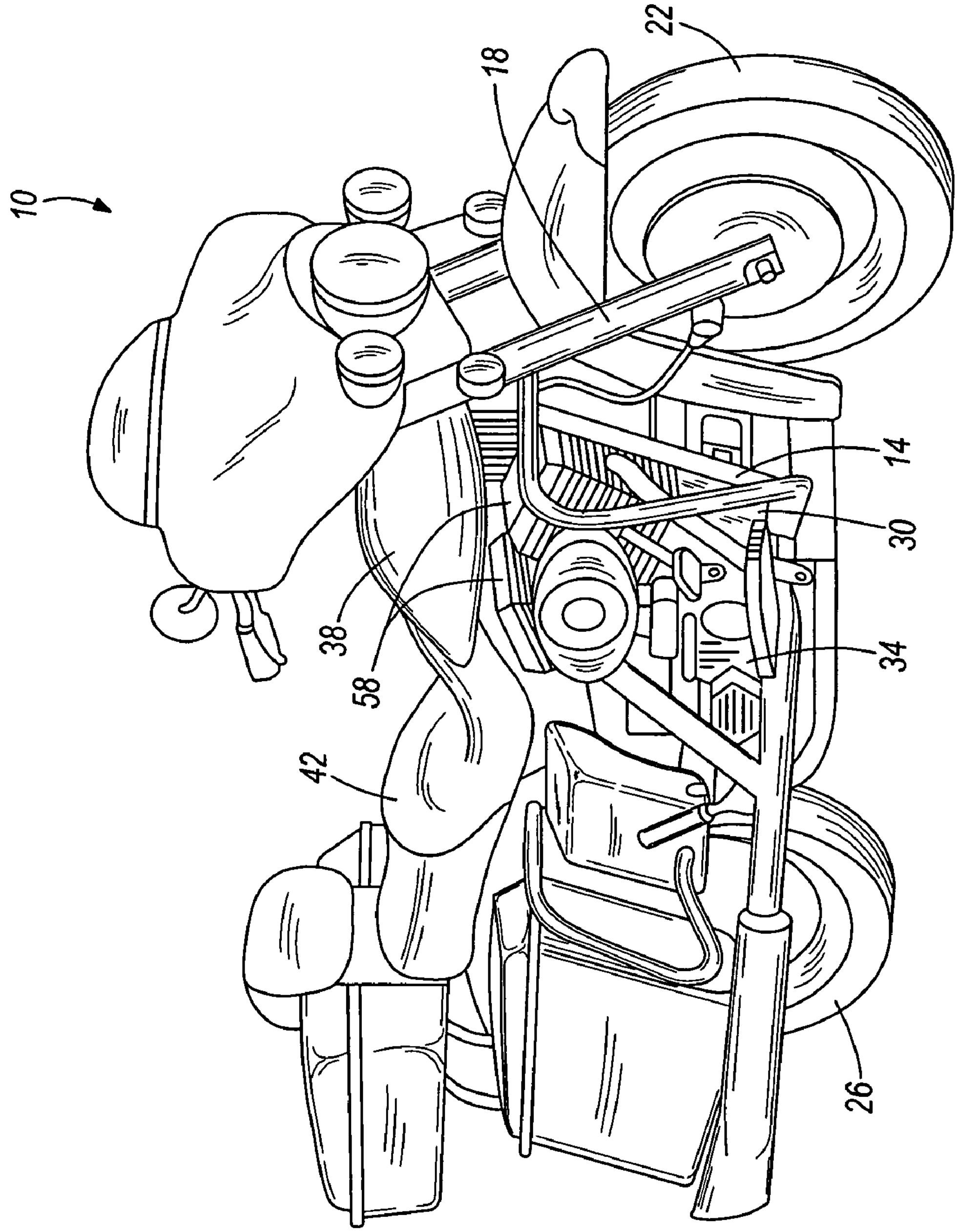
FIG. 1 is a perspective view of a motorcycle embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a motorcycle 10 having a frame 14. Mounted on the frame 14 are: a front fork assembly 18; a front wheel 22; a rear fork assembly or swing arm (not shown); a rear wheel 26; an engine 30 and a transmission 34 mounted between the front and rear wheels 22, 26; a gas tank 38; and a seat 42.

Figure 2:
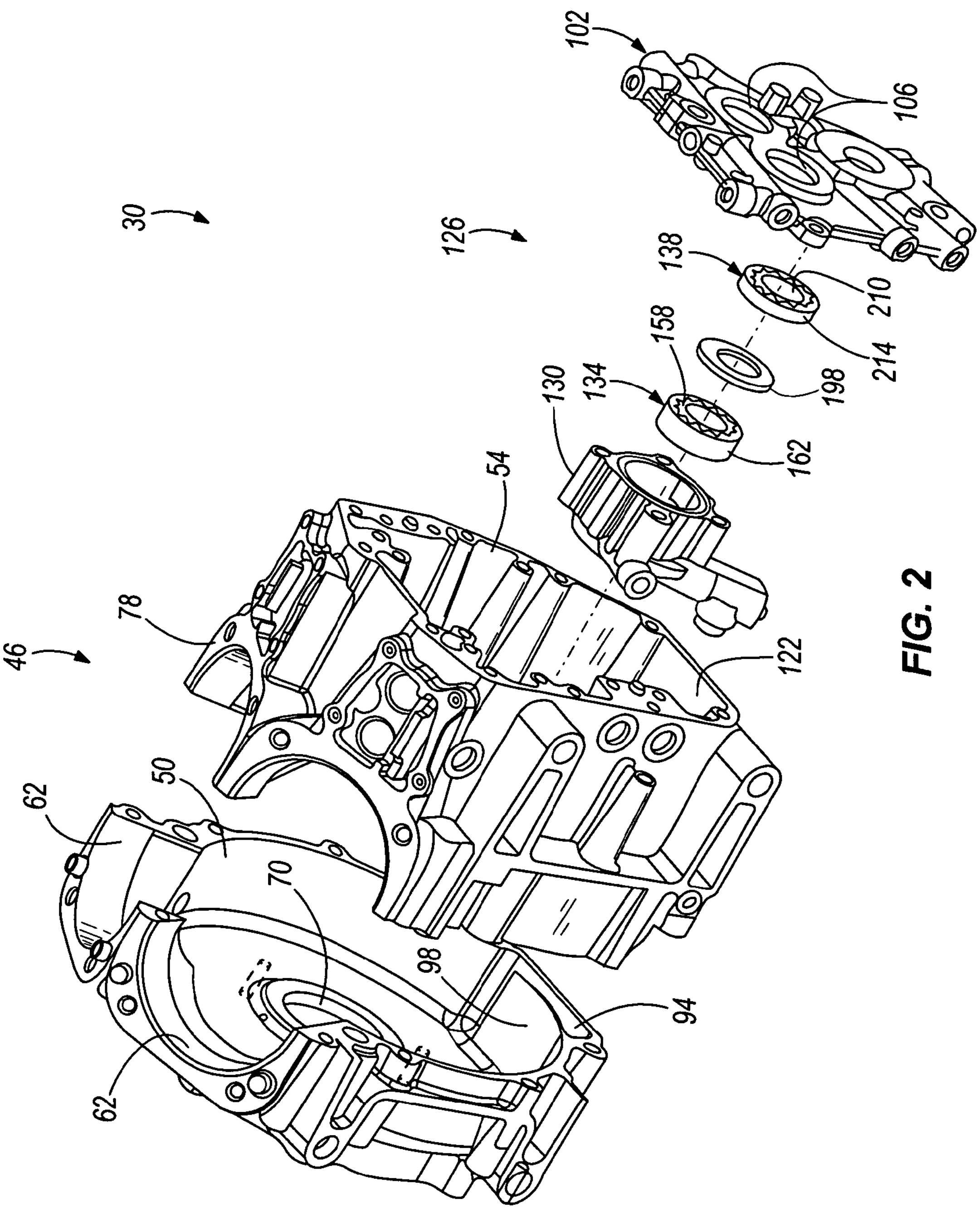
FIG. 2 is an exploded view of a portion of an engine used in the motorcycle of FIG. 1.
Figure 3:
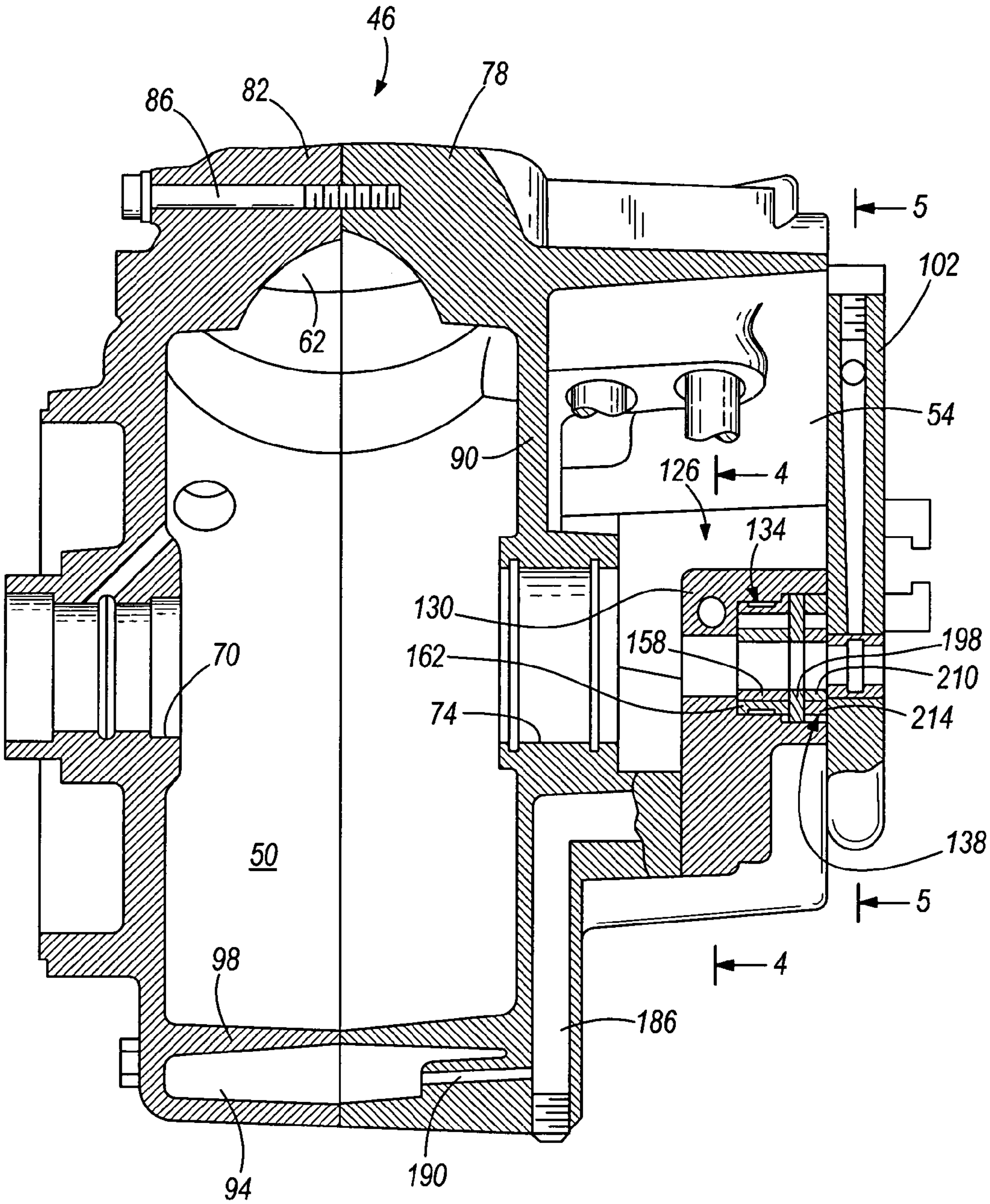
FIG. 3 is a section view of the assembled engine of FIG. 2.

FIGS. 2 and 3 illustrate the engine 30 in more detail. The engine 30 includes an engine housing 46 including a crankcase 50 and a cam chest 54. Mounted above the crankcase 50 are a pair of cylinders 58 (FIG. 1). Each cylinder 58 includes a cylinder bore 62 in communication with the crankcase 50 and sized to receive a piston (not shown) for reciprocation therein. Each piston is interconnected to a crankshaft (not shown) that is supported for rotation within the crankcase 50 by right and left end crankshaft bearings 70, 74. A connecting rod (not shown) is connected to each piston at a wrist pin bearing, and to the crankshaft at a crankpin bearing. Reciprocation of the pistons within the cylinder bores 62 rotate the crankshaft within the crankcase 50.

The crankcase 50 comprises a right half 78 and a left half 82 that are joined with fasteners 86 (FIG. 3). The right half 78 of the crankcase 50 includes a dividing wall 90 that separates the crankcase 50 from the cam chest 54. A crankcase sump 94 is provided at the bottom of the crankcase 50, and a drain plate 98 covers the portion of the crankcase sump 94 directly below the crankshaft axis of rotation. Oil draining from the crankshaft and other components in the crankcase 50 collects in the crankcase sump 94.

The cam chest 54 is defined between the dividing wall 90 and a camshaft support plate 102. The camshaft support plate 102 includes two camshaft bearings 106 (FIG. 2) for supporting the right end of each of two camshafts (not shown). The bottom of the cam chest 54 defines a cam chest sump 122 where oil draining from the camshafts and other components in the cam chest 54 collects. Oil contained in the cam chest sump 122 is prevented from flowing directly into the crankcase 50 and the crankcase sump 94 by the divider wall 90.

An oil pump 126 having a pump housing 130 is also provided. The illustrated oil pump 126 is a gerotor pump having a scavenge side gerotor 134 and a supply side gerotor 138.

Figure 4:
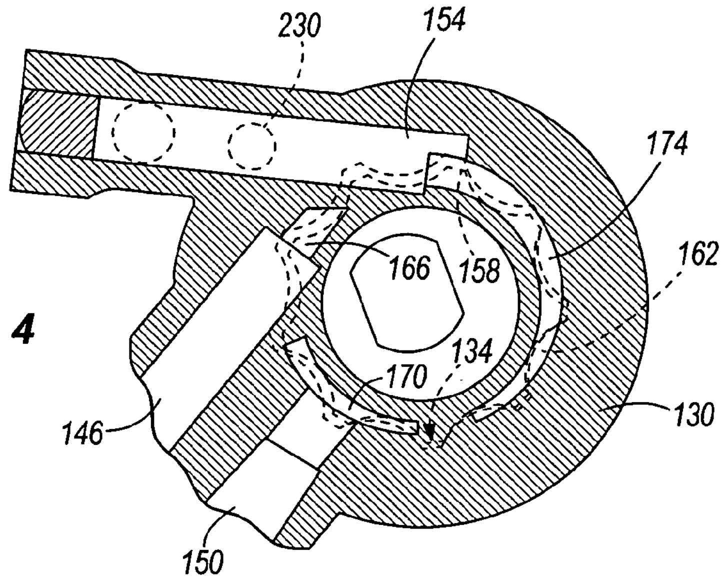
FIG. 4 is a section view of the oil pump taken along line 4—4 in FIG. 3.
Figure 5:
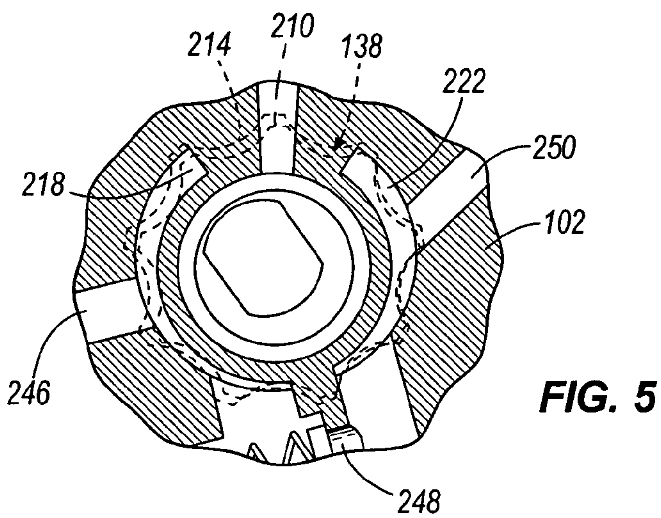
FIG. 5 is a section view of a portion of a camshaft support plate taken along line 5—5 of FIG. 3.

The scavenge side gerotor 134 includes a gear 158 and a ring 162. With further reference to FIG. 4, the scavenge side gerotor 134 fluidly communicates with a crankcase intake port 146, a cam chest intake port 150, and a discharge port 154. A first scavenging intake aperture or kidney 166 is in communication between the crankcase intake port 146 and the scavenge side gerotor 134. A second scavenging intake aperture or kidney 170 is in communication between the cam chest intake port 150 and the scavenge side gerotor 134. A scavenging discharge aperture or kidney 174 is in communication between the scavenge side gerotor 134 and the discharge port 154. Each of the first and second intake kidneys 166, 170 and the discharge kidney 174 are disposed immediately adjacent the scavenge side gerotor 134. This ensures that, for each rotation of the gerotor 134, oil is independently drawn from both the crankcase sump 94 and the cam chest sump 122.

With reference to FIG. 3, a crankcase scavenging passage 186 extends between the bottom of the crankcase 50 to the crankcase intake port 146 (FIG. 4). A narrow return passage 190 is in fluid communication between the crankcase sump 94 and the crankcase scavenging passage 186. Thus, the crankcase sump 94 is in fluid communication with the oil pump 126 through the narrow return passage 190 and the crankcase scavenging passage 186 to thereby facilitate scavenging oil from the crankcase 50.

The cam chest intake port 150 extends down to the cam chest sump 122. The cam chest intake port 150 is therefore able to draw oil directly from the cam chest sump 122.

The gear 158 is fixed to an end of the crankshaft for rotation therewith. The crankshaft rotates the gear 158 and the ring 162 relative to the housing 130. This rotation causes reduced or negative pressure over the first and second scavenge intake kidneys 166, 170, causing oil to be drawn from the crankcase sump 94 and the cam chest sump 122, respectively.

The rotation also causes increased or positive pressure within the discharge kidney 174 to discharge oil through the discharge kidney 174 and out the discharge port 154. After the oil is discharged from the scavenge side gerotor 134, the oil is directed to an external oil reservoir or oil tank (not shown).

As seen in FIG. 3, the supply side gerotor 138 is separated from the scavenge side gerotor 134 by a separator plate 198. The oil pump housing 130 is mounted to the camshaft support plate 102 with a sealing member, such as an O-ring, compressed between the housing 130 and the camshaft support plate 102.

The supply side gerotor 138 includes a gear 210 and a ring 214 that are similar to the components on the scavenge side gerotor 134. A supply intake aperture or kidney 218 and a supply discharge aperture or kidney 222 are defined in the camshaft support plate 102, each communicating with the supply side gerotor 138. Oil that has been cooled and de-aerated in the oil reservoir is drawn into the supply side gerotor 138 through the supply intake kidney 218. In a similar manner as described above with respect to the scavenge side gerotor 134, reduced or negative pressure is created in the half of the supply side gerotor 138 over the supply intake kidney 218 to draw oil into the supply side gerotor 138. Increased or positive pressure is applied to the oil over the supply discharge kidney 222 to discharge oil therethrough.

In operation, oil that has lubricated various components of the engine drains into either the crankcase sump 94 or the cam chest sump 122. In reaction to negative pressure in the scavenge side gerotor 134, oil in the crankcase sump 94 is drawn through the narrow return passage 190, up the crankcase scavenging passage 186, and into the crankcase intake port 146 of the oil pump 126. Oil in the cam chest sump 122 is drawn into the cam chest intake port 150 in reaction to negative pressure created in the scavenge side gerotor 134. The oil then enters the scavenge side gerotor 134 through the first and second intake kidneys 166, 170.

The oil is discharged from the scavenge side gerotor 134 through the discharge kidney 174 and the discharge port 154 in reaction to positive pressure in the scavenge side gerotor 134. From the discharge port 154, the oil travels through a passage 230 and is directed into an external oil reservoir.

The oil is cooled and de-aerated in the oil reservoir, and then drawn from the oil reservoir through a return passage 246 in response to negative pressure created in the supply side gerotor 138. The return passage 246 is in communication with the supply side gerotor 138 through the supply intake kidney 218.

Oil that has been drawn into the supply side gerotor is discharged through the supply discharge kidney 222. A by-pass valve 248 feeds excess oil back to the supply intake kidney 218 to maintain the pressure in the system at about 35 psi. A supply passage 250 is formed in the camshaft support plate 102, and is in fluid communication with an oil filter (not shown). The oil passes from the discharge kidney 222, through the oil filter, and then to the rocker boxes, where rockers and valves are lubricated.

Figure 6:
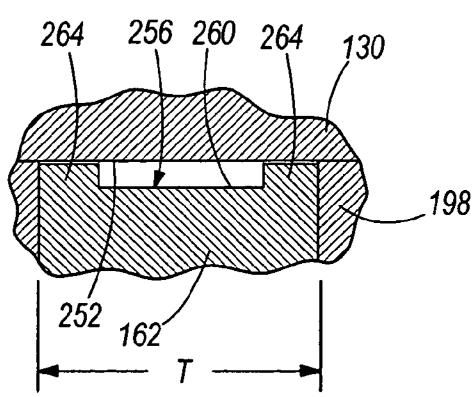
FIG. 6 is an enlarged section view of a portion of the oil pump of FIG. 4, illustrating the peripheral surface of a ring.

As best illustrated in FIG. 6, the oil pump housing 130 includes an inside diameter 252 and the ring 162 includes an outside diameter 256 that is separated from the inside diameter 252 by a distance to allow rotation of the ring 162 relative to the oil pump housing 130. The distance between the inside diameter 252 and the outside diameter 256 is non-uniform across the thickness T of the ring 162 and is generally filled with oil to lubricate the housing 130 and the ring 162. Stated another way, at least one of the radially inward surface 252 and the peripheral surface 256 is non-uniform. When an annular surface is referred to herein as being "non-uniform," it is intended to describe that the entire annular surface does not lie within a common annular plane. For example, when the oil pump 126 is viewed in cross-section similar to FIG. 6, the outer diameter 256 of the ring 162 is not linear across the thickness T of the gerotor 134.

For example, in the embodiment of FIG. 6, the outside diameter 256 of the ring 162 includes a central portion 260 and two flanking portions 264 located on a respective sides of the central portion 260. The outside diameter of the central portion 260 is smaller than each of the outside diameters of the flanking portions 264.

The non-uniform distance between the ring 162 and the housing 130 reduces the amount of power required to spin the gerotor 134 by reducing the amount of power that goes into the shearing of the oil between the oil pump housing 130 and the ring 162. The shearing force is inversely proportional to the clearance between the ring 162 and the oil pump housing 130. However, due to the fact that the clearance between the ring 162 and the housing 130 is important in establishing the timing of the volume change to the location of the kidneys 166, 170, 174, the clearance should not be increased across the full thickness T of the ring 162. Therefore, increasing the clearance along just a portion of the thickness T allows the shearing force to be reduced while still maintaining the functionality of the pump 126. Therefore, any increase in this clearance along a portion of the thickness T will reduce the torque required to spin the gerotor 134, thereby increasing engine efficiency. The reduction in torque also translates into a reduction in the amount of energy that is transferred to the oil due to shearing. Therefore the oil absorbs less energy and runs cooler, thereby further increasing the mechanical efficiency of the engine.

Figure 7:
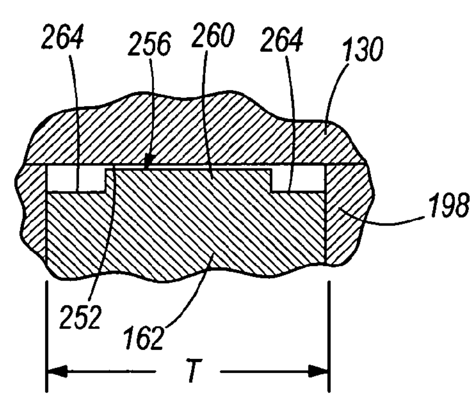
FIG. 7 is a view similar to FIG. 6, illustrating an alternative configuration of the peripheral surface of the ring.

FIG. 7 illustrates another configuration of the oil pump. In this configuration, the central portion 260 includes a larger outside diameter than the flanking portions 264.

Although, the embodiments illustrated in FIGS. 6 and 7 include sharp transitions between the larger diameter portions and the smaller diameter portions, smooth transitions between these portions are also within the scope of the present invention. Further, the outside diameter of the ring can include any combination of smooth and sharp transitions.

It is also considered within the scope of the present invention to include the non-uniform surface on the interior surface 252 of the oil pump housing 130 instead of, or in addition to, the non-uniform surface on the peripheral surface 256 of the gerotor 134. Likewise, the non-uniform surface can be included in association with the supply side gerotor 138 instead of, or in addition to, being associated with the scavenge side gerotor 134.

In other embodiments of the present invention, the non-uniform surface can include any number of larger diameter portions along with any number of smaller diameter portions. The larger and smaller diameter portions can be arranged in any order along the thickness T of the gerotor 134.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

I claim:

1. An oil pump comprising:

an oil pump housing including a cavity defining an inside diameter; and a gerotor positioned within the cavity and rotatable relative to the housing, wherein the gerotor defines a thickness and an outside diameter, and wherein the distance between the inside diameter and the outside diameter is non-uniform across the thickness, wherein the outside diameter is non-uniform across the thickness, and wherein the gerotor includes a central portion having an outside diameter and two flanking portions having outside diameters, wherein each flanking portion is located on a respective side of the central portion, and wherein the distance between the inside diameter and the outside diameter over one of the central portion and a flanking portion is greater than the distance between the inside diameter and the outside diameter over the other of the central portion and the flanking portion.

2. The oil pump of claim 1, wherein the outside diameter of the central portion is larger than each of the outside diameters of the flanking portions.

3. The oil pump of claim 1, wherein each of the outside diameters of the flanking portions is larger than the outside diameter of the central portion.

4. The oil pump of claim 1, wherein the gerotor includes a ring and a gear positioned within the ring, wherein the ring defines the outside diameter, and wherein the gear is rotatable to rotate the ring relative to the housing.

5. A motorcycle comprising:

a frame; and an engine interconnected to the frame and including an oil pump having an oil pump housing including a cavity defining an inside diameter, and a gerotor positioned within the cavity and rotatable relative to the housing, wherein the gerotor defines a thickness and an outside diameter, and wherein the distance between the inside diameter and the outside diameter is non-uniform across the thickness, wherein the outside diameter is non-uniform across the thickness, and wherein gerotor includes a central portion having an outside diameter and two flanking portions having outside diameters, wherein each flanking portion is located on a respective side of the central portion, and wherein the distance between the inside diameter and the outside diameter over one of the central portion and a flanking portion is greater than the distance between the inside diameter and the outside diameter over the other of the central portion and the flanking portion.

6. The motorcycle of claim 5, wherein the outside diameter of the central portion is larger than each of the outside diameters of the flanking portions.

7. The motorcycle of claim 5, wherein each of the outside diameters of the flanking portions is larger than the outside diameter of the central portion.

8. The motorcycle of claim 5, wherein the gerotor includes a ring and a gear positioned within the ring, wherein the ring defines the outside diameter, and wherein the gear is rotatable to rotate the ring relative to the housing.

9. An oil pump comprising:

an oil pump housing including a cavity defining a radially inward surface; and a gerotor positioned within the cavity and rotatable relative to the housing, wherein the gerotor defines a thickness and a peripheral surface, and wherein the peripheral surface is non-uniform across the thickness, and wherein the peripheral surface includes a central portion having an outside diameter and two flanking portions having outside diameters, wherein each flanking portion is located on a respective side of the central portion, and wherein the distance between the radially inward surface and the outside diameter over one of the central portion or a flanking portion is greater than the distance between the radially inward surface and the outside diameter over the other of the central portion or flanking portion.

10. The oil pump of claim 9, wherein the outside diameter of the central portion is larger than each of the outside diameters of the flanking portions.

11. The oil pump of claim 9, wherein each of the outside diameters of the flanking portions is larger than the outside diameter of the central portion.

12. The oil pump of claim 9, wherein the gerotor includes a ring and a gear positioned within the ring, wherein the ring defines the peripheral surface, and wherein the gear is rotatable to rotate the gear and ring relative to the housing.

13. A gerotor ring for an oil pump for a vehicle engine, the oil pump including an oil pump housing including a cavity defining a radially inward surface, the gerotor ring comprising:

a gerotor ring positioned within the cavity and rotatable relative to the housing, wherein the gerotor ring defines a peripheral surface, and wherein the peripheral surface of the gerotor ring is non-uniform, wherein the peripheral surface includes a central portion having an outside diameter and two flanking portions having outside diameters, wherein each flanking portion is located on a respective side of the central portion, and wherein the outside diameter of the central portion is larger than each of the outside diameters of the flanking portions.

14. A gerotor ring for an oil pump for a vehicle engine, the oil pump including an oil pump housing including a cavity defining a radially inward surface, the gerotor ring comprising:

a gerotor ring positioned within the cavity and rotatable relative to the housing, wherein the gerotor ring defines a peripheral surface, and wherein the peripheral surface of the gerotor ring is non-uniform, wherein the peripheral surface includes a central portion having an outside diameter and two flanking portions having outside diameters, wherein each flanking portion is located on a respective side of the central portion, and wherein each of the outside diameters of the flanking portions is larger than the outside diameter of the central portion.

* * * * *